(No Model.)  4 Sheets—Sheet 1.

E. G. WILLYOUNG.
APPARATUS FOR TESTING THE RESISTANCE OF CONDUCTORS OF ELECTRICITY.

No. 514,580. Patented Feb. 13, 1894.

WITNESSES:
F. Norman Dixon
James Loughran

Elmer G. Willyoung INVENTOR
By his Attorneys
Wm. E. Strawbridge
J. Bonsall Taylor (No Model.) 4 Sheets—Sheet 3.

E. G. WILLYOUNG.
APPARATUS FOR TESTING THE RESISTANCE OF CONDUCTORS OF ELECTRICITY.

No. 514,580. Patented Feb. 13, 1894.

FIG. 3.

WITNESSES:
F. Norman Dixon
James Loughran

INVENTOR
Elmer G. Willyoung,
By his Attorneys,
Wm. C. Strawbridge
J. Bonsall Taylor (No Model.) 4 Sheets—Sheet 4.

E. G. WILLYOUNG.
APPARATUS FOR TESTING THE RESISTANCE OF CONDUCTORS OF ELECTRICITY.

No. 514,580. Patented Feb. 13, 1894.

WITNESSES:
F. Norman Dixon
James Loughran

Elmer G. Willyoung,
INVENTOR
By his Attorneys,
Wm C. Strawbridge
J Bonsall Taylor

UNITED STATES PATENT OFFICE.

ELMER G. WILLYOUNG, OF PHILADELPHIA, PENNSYLVANIA, ASSIGNOR TO THE QUEEN & COMPANY, INCORPORATED, OF SAME PLACE.

APPARATUS FOR TESTING THE RESISTANCE OF CONDUCTORS OF ELECTRICITY.

SPECIFICATION forming part of Letters Patent No. 514,580, dated February 13, 1894.

Application filed June 26, 1893. Serial No. 478,802. (No model.)

*To all whom it may concern:*

Be it known that I, ELMER G. WILLYOUNG, a citizen of the United States, residing in the city and county of Philadelphia, in the State of Pennsylvania, have invented certain new and useful Improvements in Apparatus for Testing the Resistance of Conductors of Electricity, of which the following is a specification.

My invention relates especially to the class of resistance-testing apparatus of which the Wheatstone bridge is the best known example, in which an electric current is passed through a divided or multiple-arc circuit, one branch of which circuit contains two conductors of known resistance, connected in series, and the other branch of which contains one conductor of known resistance and the piece to be tested, likewise connected in series,— and in which a galvanometer, is connected across from the first named branch at the junction of its two conductors, to the second named branch at the junction of the conductor of known capacity and the piece to be tested, hereinafter, for simplicity of expression, termed the test-piece. In the operation of the Wheatstone bridge, after the current has been turned on, the known resistances are so manually adjusted relatively to the unknown resistance or test piece that no part of the current passes through the galvanometer, and, when this condition has been established, the relation, in value of resistance, of the test piece to the conductors of known resistance is revealed, and its absolute value therefore readily calculable. Results of tests made by the Wheatstone bridge, have, however, been lacking in that certainty which is indispensable to entire reliability, and this for the reason that it has been impossible to guard against such errors as are due to the presence upon the test piece itself or upon or in the clamps by which it is supported in position, of oxidation or of particles of foreign matter. Apparatus of this class as heretofore constructed has, moreover, failed to express the results obtained in terms the most available for calculation. Thus, for example, while it has given the measure of resistance of the entire test piece, it has not expressed the result in such terms as would express what precise fractional length of the test piece possesses a given or selected unit of resistance, and when the result has been desired in the terms last mentioned it has been necessary to translate into such terms by mathematical calculation, the result obtained.

It is the object of my invention to provide an apparatus for testing the resistance of electric conductors, in the use of which apparatus all possibility of the occurrence of such errors as are due to imperfect connections between the parts of the clamp and the test piece shall be eliminated; in which the result obtained shall be expressed in terms setting forth what precise length of the test piece possesses a selected unit or measure of resistance; and in which apparatus, compact and simple operative parts, capable of great nicety of manipulation, are employed.

In the drawings.

Similar letters and figures of reference indicate corresponding parts.

The general principles of construction and operation of my apparatus, together, also, with the advantages of my invention as a whole, may, perhaps, as a preliminary to the more detailed description of the apparatus, be best explained by reference to the diagram of Fig. 1.

Figure 1:
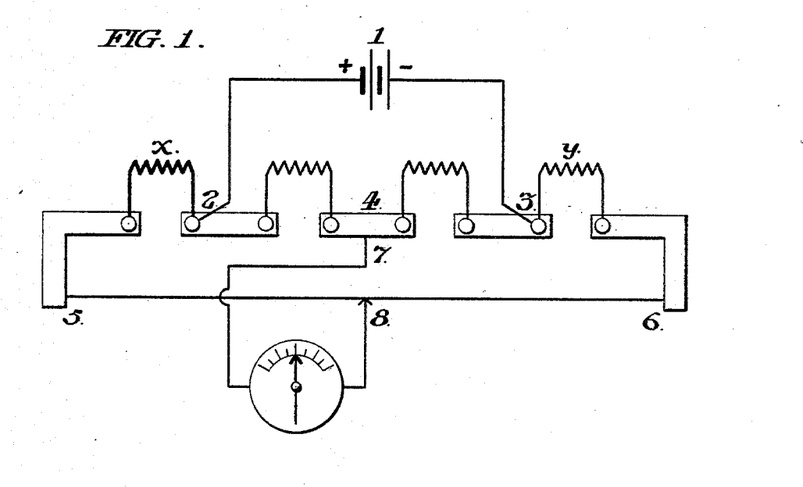
Figure 1 is a diagrammatic illustrative view of a battery and conductor wires leading therefrom, and of resistances and a test-piece, together constituting a multiple-arc circuit; and also of a galvanometer connected across from one branch to the other branch of said multiple arc circuit.

Referring to the diagram of Fig. 1, 1 is a battery, having single conductors which lead therefrom, and which conductors, at the points 2 and 3, divide to form a multiple-arc circuit, the first branch of which is designated 2, 5, 6, 3 and the second branch 2, 4, 3.

7, 8, is a conductor, the end 7 of which is connected with the aforesaid second branch 2, 4, 3, at the point 4; and in circuit with which conductor 7, 8, is a galvanometer.

2, 4, and 3, 4, represent respectively two approximately known and assumed equal resistances of the second branch.

2, 5, and 3, 6, represent respectively two known and assumed unequal resistances of the first branch, 2, 5, 6, 3;—and 5, 6, represent a test piece connected in series between said unequal resistances. The resistance 2, 5, may be supposed to be less by one ohm than the resistance 3, 6. A test piece, the resistance of which is to be determined, being supposed in place, the battery circuit is closed, and the current passes from + to the left along the single conductor, divides at the point 2, traverses both branches 2, 4, 3, and 2, 5, 6, 3, and from the point 3 continues along the single conductor — back to the battery. The potential of the current of the first branch 2, 5, 6, 3 at some point of the length of said branch, necessarily equals the potential of the current of the second branch 2, 4, 3, at the point 4, and the proportioning of the known resistances of said branches is intentionally such that said point in the first branch 2, 5, 6, 3, will exist intermediate of the length of the test piece 5, 6. To find said point in the first branch,—which I hereinafter term the potential balance point,—the terminal 8 of the galvanometer circuit 7, 8, is placed upon the test piece and moved along the same until the galvanometer indicates zero, and said balance point, when thus found is to be recorded.

The difference in value between the resistances 2, 5, and 3, 6,—(which may be created in any preferred manner, and is, for the purpose of the explanation of the diagram assumed to be due to the fact that the coil $x$ is made of larger wire than the corresponding coil $y$)—is, as stated, assumed to be one ohm, and, after the first potential balance point has in the manner above explained been found and recorded, the coils $x$ $y$ are interchanged, the result of which will naturally be to shift said potential balance point along the test piece that lateral distance, whatever it may be, which represents the required length or linear fraction of the test piece which possesses a resistance equal to the stated difference between the unequal resistances 2, 5, and 3, 6,—said difference as stated happening in the instance under consideration to be one ohm, or the selected unit of resistance the equivalent of which in length of test-piece it is desired to find. This new and second potential balance point necessary to be found under the altered conditions to give the required result, will of course be found in the same manner as the first potential balance point, and the distance between the first potential balance point, and the second potential balance point found under the said altered conditions involved in the interchange of the coils $x$ $y$ of dissimilar resistance, will be the required fractional length of conductor.

As will be understood from a study of the diagram of Fig. 1, and a consideration of the operation described, imperfect connection between the parts of the apparatus and the test-piece, or the presence of dust and non-conducting foreign matters in the joints between the parts of the test-piece-holding clamps, are rendered of no moment, because any opposition which they constitute to the passage of the current, operates to shift both the potential balance points to the right or left, as the case may be, without altering the distance between them. Thus, for example, the presence of an imperfect connection at the point marked 5 would operate by interfering with the free passage of the current, to shift the first potential balance point somewhat farther to the left than would otherwise be the case, but would also, after the interchange of the unequal resistances with like effect operate to shift the second potential balance point a corresponding distance to the left, and this without affecting the relation of said two points to each other, and therefore without creating error in the result.

Having thus explained the nature, objects, advantages, and the principles of construction and operation, of my invention, I now proceed to a description in detail, of the form of apparatus represented in the drawings.

Figure 2:
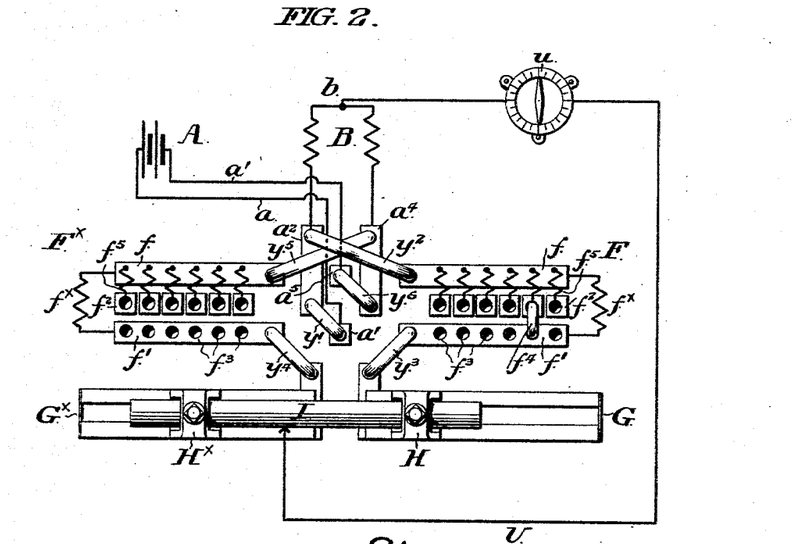
Fig. 2 is a view in top plan, of certain only of the principal elements of my improved apparatus, representing, in diagrammatic form, the electrical connections existing between the parts depicted.

Referring first to Fig. 2, which represents certain of the principal parts of my improved apparatus removed from their containing case 13 but grouped in the manner in which they exist in the complete apparatus, and represents the connections in a more or less diagrammatic form, A is the battery. The circuit energized by the battery leads in the form of a conductor $a$ to a block $a'$ which is in turn electrically connected to a block $a^2$ by a yoke $y'$ the respective extremities of which, as also those of the other yokes hereinafter mentioned, are entered in mercury cups of usual construction existing in the devices which they connect. The conductor composed of $a$, $a'$, $y'$, and $a^2$, divides at the block $a^2$ to form a multiple-arc circuit the branches of which are respectively hereinafter referred to as the first and second branches. The second branch, conveniently illustrated in Fig. 2 in the form of a wire B, leads, as shown, from the block $a^2$ to the block $a^4$, that portion of it between the block $a^2$ and the point $b$ constituting one, and the remaining portion of it between the point $b$ and the block $a^4$ constituting another, resistance, which said two resistances are of approximately known and preferably equal value. The first branch comprehends a pair of variable resistance blocks F, F$^\times$, a pair of slide-way plates G, G$^\times$, a pair of clamps H, H$^\times$, adapted to said plates, and a test piece I mounted in said clamps,—the blocks $a^2$ and F being connected by the yoke $y^2$,—the block F and the plate G by the yoke $y^3$,—the plate G$^\times$ and the block F$^\times$ by the yoke $y^4$,—and the blocks F$^\times$ and $a^4$ by the yoke $y^5$. From the block $a^4$ where the first and second branches unite, the circuit is continued through a yoke $y^6$ to a block $a^5$, and from said block $a^5$ through the wire, $a$, back to the battery. When the parts are in the position represented in Fig. 2, the yoke $y^2$, resistance block F, yoke $y^3$, slide-way plate G, and clamp H, constitute one,—and the clamp H$^\times$, slide-way plate G$^\times$, yoke $y^4$, resistance block F$^\times$ and yoke $y^5$, the other,—of the two resistances of the first branch. U is a conductor in circuit with the galvanometer $u$, at one end connected with the second branch at the point $b$, and at the other, or, so to speak, free end, adapted to make contact with the test piece I through the guide bar, contact carriage and key hereinafter described, in which said wire terminates.

Figure 4:
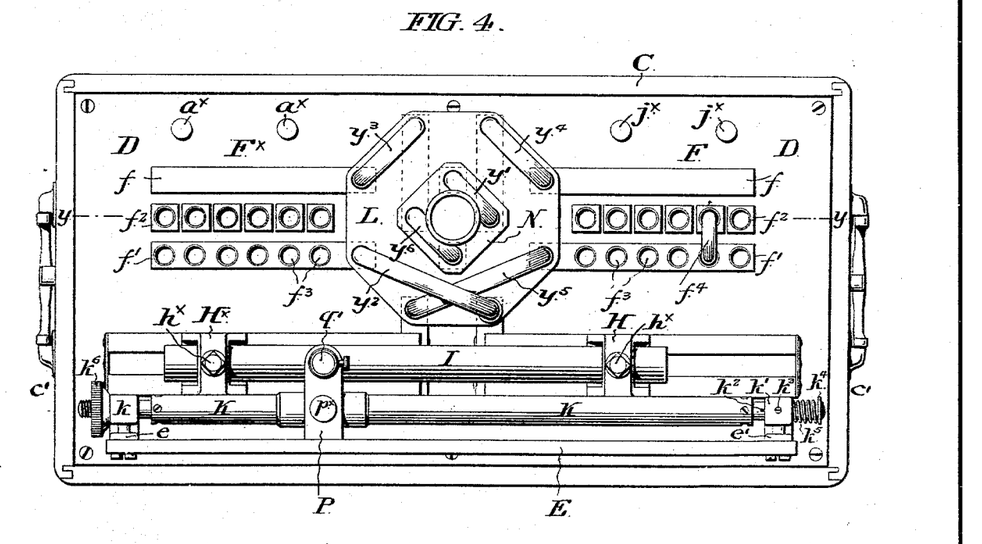
Fig. 4 is a top plan view of a complete apparatus embodying my invention and mounted in its containing case.
Figure 5:
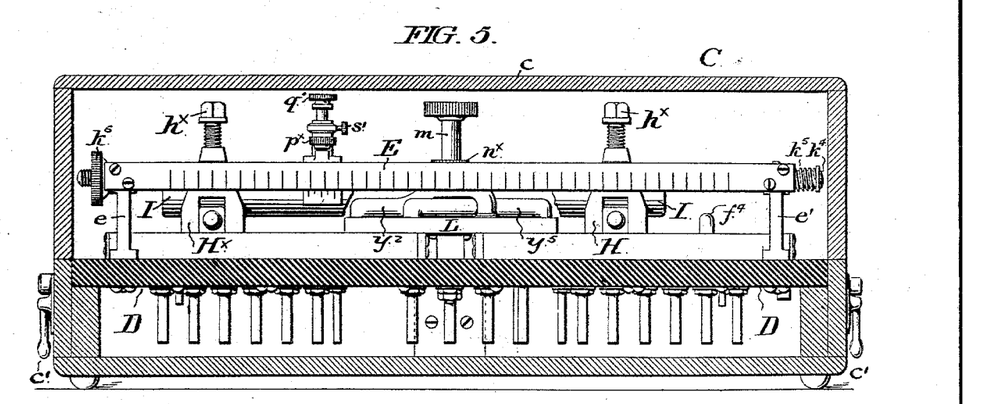
Fig. 5 is a view in front elevation of the apparatus represented in Fig. 4, the front portion of the case being supposed removed to exhibit the interior construction.

The construction and arrangement of the several elementary parts of the apparatus, are as follows:

C, Figs. 4 and 5, is a containing and supporting casing, of any preferred character and dimensions, and conveniently provided with a lid $c$, and with handles $c'$.

D is a non-conducting bed plate of any suitable material, horizontally disposed within the casing, beneath which, in any preferred manner, the electrical connections herein described as existing between the assembled elements are conveniently made.

I have not deemed it necessary to represent in all of the figures of the drawings, to designate by letters and numerals of reference, or to describe in detail, the form and arrangement of all of the wires or conductors which constitute the numerous electrical connections between the several elements, as they will be sufficiently understood from the diagrammatic views. Thus, for instance, in the complete apparatus as illustrated in Figs. 4 to 12, while the battery and galvanometer are omitted, the binding posts $a^\times$ $a^\times$, Fig. 4, for the conductors of the battery circuit, and the binding posts $j^\times$ $j^\times$ for those of the galvanometer circuit, are represented. Thus, also, a permanent conductor is supposed to exist within the apparatus which leads from one of the binding posts $j^\times$ to the point $b$ of the second branch B,—and a second permanent conductor which leads from the other binding post $j^\times$ to the guide bar, which together with the contact carriage and key hereinafter described, constitutes the terminal of said second conductor. Thus, also, permanent conductors are supposed in place within the apparatus to connect the binding posts $a^\times$ $a^\times$ with the blocks $a'$ $a^5$.

The resistance blocks F, F$^\times$, are structurally counterparts of each other, except that one, assumed to be that designated F, preferably possesses slightly greater resistance than the other. Each resistance block consists of two plates $f$, $f'$, conveniently supported in parallelism, and permanently connected in series by the conductor $f^\times$, and also, as stated, connected in series in the first branch circuit of the apparatus.

$f^2$ are a series of cup blocks, six being shown, located between the plates $f$ and $f'$, and each embodying a mercury cup. All of these mercury cups are insulated from each other, normally also insulated from the plate $f'$, connected to the plate $f$ by a series of independent conductors $f^5$, which are successively graduated in respect of resistance, and each supported opposite to one of a corresponding series of mercury cups $f^3$ formed in the plate $f'$.

$f^4$ is a cup-yoke of such size as to be adapted to engage as to one leg in the mercury cup of any one of the cup blocks $f^2$—and as to the other leg in the corresponding mercury cup of the plate $f'$. As will be understood, the cup blocks $f^2$ and the conductors $f^5$ by which they are connected to the plate $f$ are normally out of circuit and idle, each resistance block as a whole possessing a given resistance independently of said devices. When, however, it is desired to diminish the resistance of a given variable resistance block, the yoke $f^4$ has one of its legs dropped into one of the mercury cups $f^2$ and the other into the corresponding cup $f^3$, thus joining one of the conductors $f^5$ in parallel with one of the fixed resistances $f^\times$. The particular resistance of one of the series $f^5$, chosen, is such that when so placed in parallel with one of the fixed resistances $f^\times$, the resultant combined resistance will possess the required value.

The test-piece, or conductor to be tested, is supported by means of two clamps H, H×, respectively adapted to two slide-way plates G, G×, being, as stated, members of the first branch circuit, and preferably counterparts of each other. Each clamp preferably consists of a frame having a solid inner wall $h$, a front wall $h'$, side wall $h^2$, and a top, said frame being open as to its base, open or slotted as to the lower portion of its front wall, and as to the upper portions of its sides,— and its top embodying a threaded opening for a clamp screw $h^×$. The lower edges of the walls of the frame rest upon the surface of its slide way plate, and the side walls are provided each with a dovetailed tongue $h^3$ engaged in a corresponding dovetailed groove $g$ in said slide way plate.

Figures 6, 7, 8, 9, 10, 11, 12:
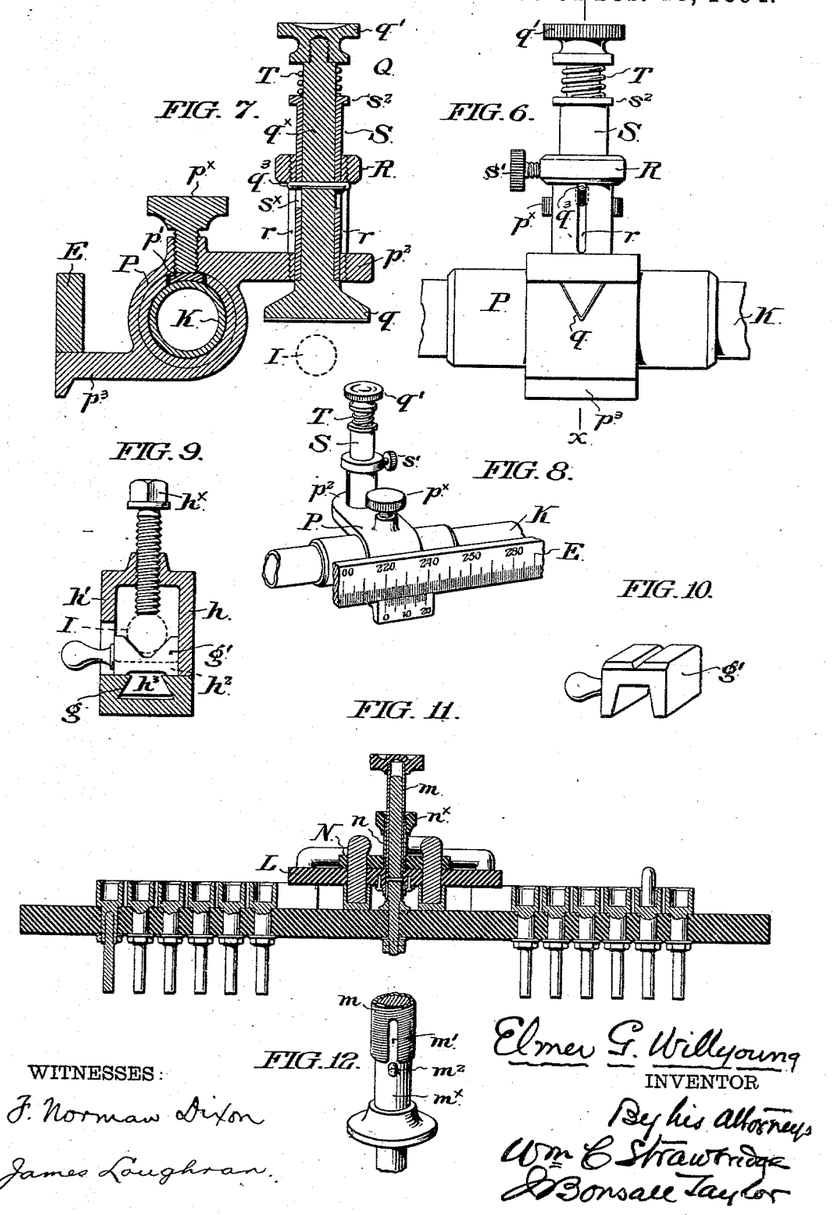
Fig. 6 is a view in elevation of the contact carriage and key mounted upon the guide rod, sight being taken from the rear or inner side of said device.
Fig. 7 is a vertical side sectional elevation of the device represented in Fig. 6 taken on the line $x$—$x$ of Fig. 6, and showing, in addition, the scale bar in cross section.
Fig. 8 is a view in perspective, sighted from the front of the apparatus, of the guide bar, contact carriage and key, scale bar, and vernier.
Fig. 9 is a transverse sectional elevation of a clamp block and the slide way plate upon which it is mounted, showing also an adjustment block and the test piece as in place within said clamp block.
Fig. 10 is a view in perspective of one of the adjusting blocks.
Fig. 11 is a vertical longitudinal sectional elevation through the insulating bed plate, the variable resistance blocks, the yoke carrier and pole changing plate, section being supposed on the line $y$—$y$ of Fig. 4.
Fig. 12 is a fragmentary view in perspective of the lower portion of the handle of the yoke carrier and of the spindle upon which the same is mounted.

When the test piece is of comparatively small diameter I prefer, in order to render it more readily accessible to the contact key, whereof hereinafter, to elevate it somewhat above the base of the frame blocks, and to accomplish this I find it convenient to resort to the use of insertible adjusting blocks, $g'$, a number of which, by pairs of graduated sizes, are to be furnished with the apparatus, and two of which, selected with reference to the diameter of the test piece, are to be employed at a time, being respectively entered through the slotted or open fronts of each of the respective clamp blocks. As shown in Fig. 9, said blocks rest directly upon the slide plates, and, as will be understood, the test piece being in place, the descent of the clamp screw $h^×$, upon said test piece and block, locks the frame, test piece, and block, very firmly together and to the slide way plate.

As hereinbefore explained, the two resistances of one of the branches of the multiple-arc circuit are to be of unequal value, and are, in the operation of my apparatus, to be reversibly or interchangeably used in the operation of making a test. This interchange of said resistances may obviously be accomplished, either by shifting the yoke $f^4$ from one variable resistance block to the other, so as to cause each to possess the value in resistance that the other possessed before the yoke was shifted;—or else, as explained in connection with the description of the diagram of Fig. 1, by the actual physical exchange of the conductors constituting the unequal resistances.

In the form of apparatus illustrated in the drawings and herein described, either of these modes of effecting the interchange of resistances may be resorted to at will.

To reverse the unequal resistances by physical alteration of the resistances first employed, for example, I proceed as follows: Assuming, for simplicity of explanation, that the variable resistance blocks F F× normally have an equal resistance of the value, for example, of two ohms, and that when the yoke $f^4$ is, as shown, placed in one of the said blocks in position to throw the second conductor of the series $f^5$ into circuit, it will reduce the resistance of said variable resistance block to one ohm,—it will be obvious that the required physical alteration necessary to constitute the required interchange or reversal of resistances may be effected by shifting said yoke to a corresponding position in the other variable resistance block F×, of course, under the assumption that the resistances $f^5$ on one side are symmetrical with and equal to the resistances $f^5$ upon the other side. I prefer, however, to employ the variable resistance blocks to adjust to the desired inequality the values of the two resistances of the branch in which they are employed, and to effect the interchange of resistances by reversing the arrangement of the connections of the terminals of the resistance blocks F and F×. To accomplish this, after the first potential balance point has been found in making a test, I lift from their seats the yokes $y'$ $y^2$ $y^3$ $y^4$ $y^5$ $y^6$ assumed to be in the positions shown in Fig. 2, and place them in the positions they are shown as occupying in Fig. 3, in which the block $a^2$ and slide way plate G, instead of being, as shown in Fig. 2, connected through a circuit consisting of the yoke $y^2$, the resistance block of higher resistance F, and the yoke $y^3$, are connected through a circuit consisting of the yoke $y^3$, the resistance block of lower resistance F×, and the yoke $y^2$,—and in which, on the other hand, the block $a^4$ and slide way plate G×, instead of being connected through a circuit consisting of the yoke $y^4$, the resistance block of lower resistance, F×, and the yoke $y^5$, are connected through a circuit consisting of the yoke $y^4$, the resistance block of higher resistance, F, and the yoke $y^5$. In the foregoing reversal the positions of the yokes $y'$ $y^6$ are simply exchanged.

Figure 3:
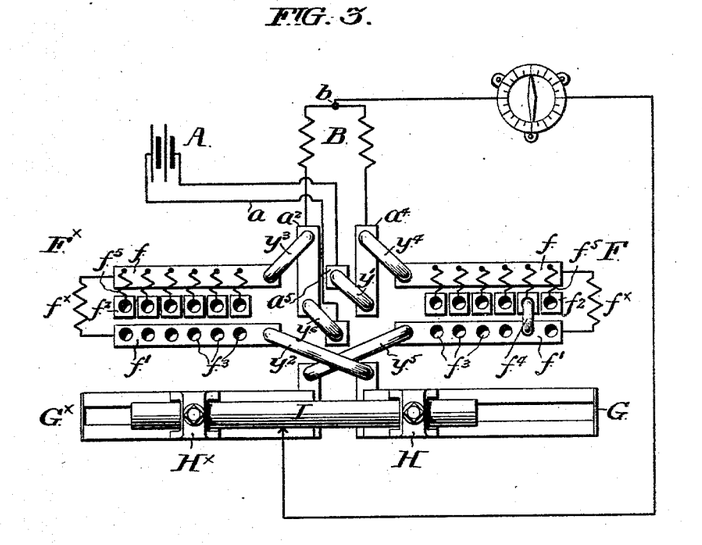
Fig. 3 is a view similar to Fig. 2, showing, however, the yokes which constitute the commutator or switch device, as in their reversed position.

In order conveniently to effect the reversal described I provide a yoke-carrying plate L, through suitable openings in which the legs of the yokes pass, and upon which the bodies of the yokes rest,—the positions of said openings, the dimensions of the yokes, and the situations of the mercury cups, being all so calculated and arranged that the yokes occupy the same physical relation to each other in both positions,—from which it results that when the yokes are in one of the alternate positions described, for example that shown in Fig. 2, by simply elevating the carrying-plate sufficiently for the yokes to clear the mercury cups, giving it a half rotation, and lowering it, the legs of the yokes find and enter the appropriate, or, so to speak, opposite mercury cups, and are brought into their alternate or opposite position or that shown in Fig. 3. The yokes thus constitute a commutator or switch device.

The yoke carrier, as I term the plate L, is conveniently provided with a vertical upwardly extending tubular handle $m$, opening below the yoke carrier, the wall of which handle embodies two oppositely disposed slots $m'$, Fig. 12, extending to its lower end through which they open.

$m^x$ is a vertically-erected stem adapted to enter the hollow interior of said handle, rigidly secured to the bed plate, and equipped with a transverse pin $m^2$ the protruding end of which enters one of the slots $m'$. To reverse the yokes, the yoke carrier is first lifted by its handle $m$ until one of its slots, $m'$, clears the pin $m^2$; it is then rotated until the other slot comes into registry with the end of the pin,—and is then lowered, the pin and slot contrivance serving as a guide to direct the legs of the yokes into the proper mercury cups.

I prefer to provide the apparatus with a suitable pole-changing device, and find the following to be a convenient form.

N is a small battery pole-changing plate, resting upon the yoke carrier L, in suitable openings through which (in registry with corresponding openings through the yoke carrier L,) the legs of the yokes $y'$ and $y^6$ are entered.

$n$ is a hollow sleeve, rigidly connected with the plate N, encompassing the handle $m$ of the yoke carrier, and equipped at its upper end with an annular enlargement $n^x$ which serves as a knob. By means of the knob $n^x$ the plate N with its yokes $y'$ and $y^6$ may, in order to effect the changing of the battery poles, be elevated independently of the yoke carrier L, be given a quarter turn, and be lowered so that the legs of its yokes drop through the openings in the carrier L and into the underlying mercury cups.

The devices by which, in the testing of a given conductor or test piece, the potential balance points are found and measured are conveniently of the following construction:

E, Figs. 4, 5, 7, and 8, is a scale bar, conveniently supported horizontally and in parallelism with the front portion of the apparatus, upon brackets $e\ e'$, and provided with markings indicating graduations of any selected unit of linear measurement.

K is what I term the guide bar, conveniently supported by the brackets $k\ k'$ in a horizontal position at the front of the case. One extremity of the bar is entered in the bracket $k'$ and embodies a groove $k^2$ in which, to prevent rotation, is entered a stud or screw, $k^3$, mounted in said bracket $k'$. The extremities of the bar extend beyond the respective brackets, $k, k'$, and to permit of a slight longitudinal adjusting movement of the bar being made, one projecting extremity is provided with a head $k^4$ between which and the adjacent bracket $k'$ is compressed a spiral spring $k^5$. The other projecting extremity is threaded and provided with a thumb nut $k^6$ which in its advance rotation is adapted to bear against the adjacent bracket $k$ and to draw the guide bar outward, overcoming, in such action, the resistance of the spring $k^5$, which, in turn, operates to retract the bar when the nut is reversely rotated.

P is what I term the contact carriage, being a tubular body mounted upon and adapted to be longitudinally moved with respect to, the guide bar K, and also adapted to have a rocking movement with relation to it. Said carriage is conveniently provided with a set screw $p^x$ entered through a suitably threaded aperture, and the advance extremity of which, to avoid abrasion of the guide bar, is preferably provided with an internal shoe $p'$. This screw serves to lock the carriage in any selected position upon the bar.

$p^2$ is an inward extension of the carriage, in which is mounted the contact key Q, and $p^3$ is an outward extension of the carriage, the front face of which is provided with graduated markings constituting a vernier.

The contact key, by which the galvanometer circuit is brought into contact with the test piece, is designated Q, and is shown as consisting of a head $q$ having a knife edge, a body $q^x$ in the form of a stem, and a handle $q'$ mounted upon the upper end of said stem, the whole being mounted after the manner of a plunger in a permanent annular shell R vertically erected from the inward extension $p^2$,—in a suitably threaded aperture in which extension the lower end of said shell is screwed.

S is a sleeve existing within the shell R and adapted to be fixedly secured with relation thereto by the set screw $s'$; said sleeve is of length almost equal to that of the stem of the key which it embraces,—and against a circumferential shoulder at the lower end of which key its own lower end is adapted to abut.

$r$ are long vertical slots in the wall of the shell R.

$s^x$ are short vertical slots in the wall of the sleeve S, in registry with the slots $r$, and $q^3$ is a pin transversely mounted in the key stem, the protruding extremities of which pin engage in the slots $r$ and $s^x$. The key is constantly forced upward by a spring T embracing its upper end and bearing against the upper end $s^2$ of the sleeve S. The sleeve S being supposed locked fast to the annular shell R, when pressure is applied to the head of R, the contact key, said key is forced to descend, compressing the spring T, until the pin $q^3$ encounters the lower ends of the slots $s^x$. If the test piece is not sufficiently elevated to be encountered by the key in its above limited range of movement, the screw $s'$ is loosened to release the sleeve S, and the latter lowered and locked in a position in which the range of movement of the key is sufficient to occasion encounter with the test piece.

Having now described a preferred form of apparatus, it is proper to add that if during the taking of a test the galvanometer indicates the presence of current in the galvanometer circuit, the carriage and key are moved along the guide bar to a new position in which during the period of contact of the key with the test piece the galvanometer will indicate zero.

Observance of the deflections of the needle in the successive test contacts of the key with the test piece, will aid the operator in bringing the carriage and key to the proper position. A very delicate adjustment of the carriage and key may be made, in addition to movement of the carriage upon the guide bar, by the rotation of the screw $k^6$.

By means of the scale bar and vernier the precise points of location of the potential balance points may be noted.

While I have herein spoken of each branch of the multiple-arc circuit as containing two resistances, it is to be understood that the conductors of the second branch of the circuit need not be physically independent conductors, but may and in fact preferably are, both composed of a single continuous conductor, which, however, is in effect two conductors connected in series. Thus, referring to Fig. 2, the second branch of the multiple-arc circuit is shown as consisting of a single continuous conductor, which is considered as divided at the point of connection (b) of the galvanometer conductor, into two resistances or conductors.

Having thus described my invention, I claim—

1. In an apparatus for determining resistances of a test-piece, in combination:—line conductors of an electric circuit;—conductors constituting a multiple-arc circuit one of the branches of which comprises two resistances and means for supporting a test-piece in series between them, and the other of the branches of which comprises two resistances,—both resistances of one of said branches being provided with adjusting devices for at will varying by known amounts the difference between their respective values;—means for determining the point at which the potential of the branch containing the test-piece is the same as that of the other branch at the junction of its two resistances;—and means for reversing the unequal resistances;—substantially as set forth.

2. In an apparatus for determining the resistance of a test piece, in combination:—line conductors of an electric-circuit;—conductors constituting a multiple-arc circuit one of the branches of which comprises two resistances and means for supporting a test-piece in series between them, and the other of the branches of which comprises two resistances,—both resistances of one of said branches being provided with adjusting devices for at will varying by known amounts the difference between their respective values;—a galvanometer, connected as to one of its terminals with the second named branch at the junction of its two resistances, and as to its other extremity adapted to make contact with the test-piece at various points of the length of the latter;—and means for reversing the unequal resistances;—substantially as set forth.

3. In an apparatus for determining the resistance of a test-piece, in combination:—line conductors of an electric circuit;—conductors constituting a multiple-arc circuit one of the branches of which comprises two resistances and means for supporting a test-piece in series between them, and the other of the branches of which comprises two resistances,—both resistances of one of said branches being provided with adjusting devices for at will varying by known amounts the difference between their respective values;—a galvanometer connected as to one of its terminals with the second named branch at the junction of its two resistances, and as to the other adapted to make contact with the test-piece at various points of the length of the latter;—a commutator or switch device connective of the terminals of the line conductors and of the multiple-arc circuit, said device being adapted to be set to place the respective line conductors in circuit with either of the terminals of the multiple-arc circuit at will;—substantially as set forth.

4. In an apparatus of the class described, a variable resistance-block, consisting of a pair of plates connected in series, a series of conductors of graduated resistance connected with one of said plates and adapted to be also connected with the other, substantially as set forth.

5. In an apparatus of the character described, a variable resistance block, consisting of a pair of plates electrically connected and placed side by side,—a series of independent mercury cups connected each by one of a series of conductors of graduated resistance with one of said plates,—a series of holes formed in the other of said plates, and a yoke the legs of which are adapted to be entered respectively in one of the mercury cups and one of the holes of the plate,—substantially as set forth.

6. In an apparatus of the class described, as a means for supporting a test-piece, slide plates having dovetailed grooves, in combination with a pair of clamp blocks provided with dovetailed tongues entered in said grooves, having open sides or ends to receive a clamp screw to clamp, and means to support, the test piece, substantially as set forth.

7. In an apparatus of the character described, in combination:—the slide-way plate having a dovetailed groove, a clamp block having a dovetailed tongue entered in said groove, and ends and a base which are open, an adjusting block adapted to be placed in said clamp block, to rest as to its base upon the upper face of the slide-way, and to support upon its upper face the test-piece, and a clamp screw adapted to bear upon the test-piece, substantially as set forth.

8. In an apparatus of the class described, as a means for making connection with a suitably supported test-piece at various distances of its length to determine the potential of the current existing therein,—a guide bar, a carriage mounted for sliding movement upon said bar, means for locking said carriage in determined positions of adjustment, a contact key mounted as a plunger in said carriage, and a sleeve embracing said key and adapted to be secured in various positions of vertical adjustment,—substantially as set forth.

In testimony that I claim the foregoing as my invention I have hereunto signed my name this 24th day of June, A. D. 1893.

ELMER G. WILLYOUNG.

In presence of—
J. BONSALL TAYLOR,
F. NORMAN DIXON.